US012591604B2

(12) United States Patent
Detmer et al.

(10) Patent No.: US 12,591,604 B2
(45) Date of Patent: Mar. 31, 2026

(54) INTELLIGENT ASSISTANT

(71) Applicant: FMR LLC, Boston, MA (US)

(72) Inventors: Allen Detmer, Patriot, IN (US); Aisling Doyle, Weston, MA (US)

(73) Assignee: FMR LLC, Boston, MA (US)

( * ) Notice: Subject to any disclaimer, the term of this patent is extended or adjusted under 35 U.S.C. 154(b) by 236 days.

(21) Appl. No.: 18/209,100

(22) Filed: Jun. 13, 2023

(65) Prior Publication Data

US 2024/0419696 A1      Dec. 19, 2024

(51) Int. Cl.
G06F 16/3329 (2025.01)
G06F 40/289 (2020.01)

(52) U.S. Cl.
CPC ........ G06F 16/3329 (2019.01); G06F 40/289 (2020.01)

(58) Field of Classification Search
CPC .......................... G06F 16/3329; G06F 40/289
See application file for complete search history.

(56) References Cited

U.S. PATENT DOCUMENTS

| | | | |
|---|---|---|---|
| 8,918,459 B2 | 12/2014 | Smyth et al. | |
| 10,750,019 B1 * | 8/2020 | Petrovykh | H04L 51/02 |
| 11,140,265 B1 * | 10/2021 | Palmer | H04M 3/2281 |
| 2018/0103149 A1 | 4/2018 | Skiba et al. | |
| 2019/0311036 A1 | 10/2019 | Shanmugam et al. | |
| 2020/0143475 A1 | 5/2020 | Sandhu et al. | |
| 2020/0349614 A1 * | 11/2020 | Batcha | G10L 15/26 |
| 2022/0107979 A1 * | 4/2022 | Coope | G10L 15/22 |
| 2023/0011434 A1 * | 1/2023 | Werdell | G06Q 30/016 |

* cited by examiner

*Primary Examiner* — Sonia L Gay

(74) *Attorney, Agent, or Firm* — Cesari and McKenna, LLP

(57)                    ABSTRACT

A computer implemented method is provided for assisting an agent in providing feedback to a customer during a chat session. The method includes receiving live feedback from the agent to the customer in response to an inquiry from the customer. The method also includes determining if at least one automated response is needed by comparing and matching the live feedback with at least one predefined trigger pattern. The method further includes identifying one or more trigger phrases in the live feedback if automated response is needed and determining from a conversation history database at least one automated response based on the one or more trigger phrases. The method additionally includes appending the at least one automated response to the live feedback for presentation to the customer during the chat session.

14 Claims, 3 Drawing Sheets

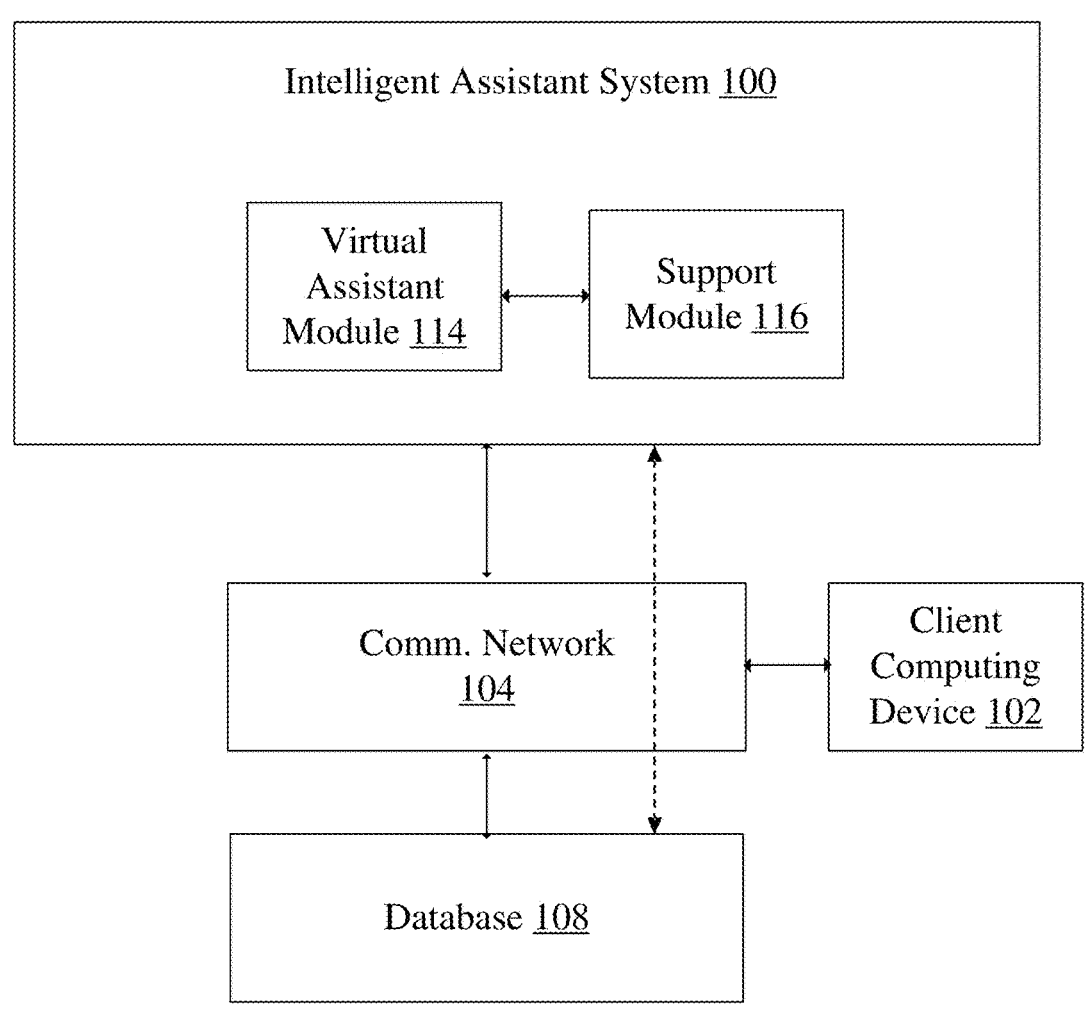
FIG. 1

200

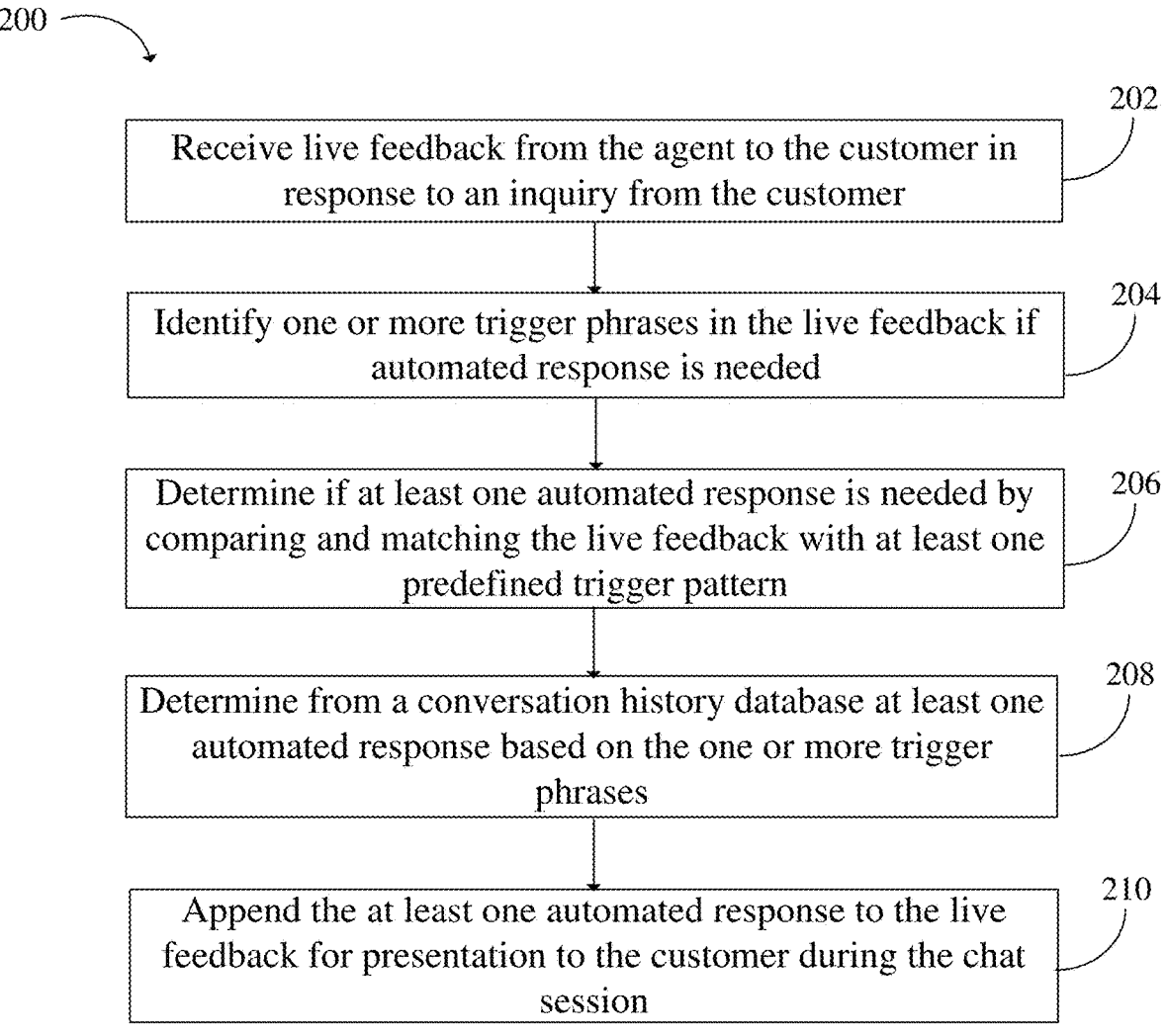

Receive live feedback from the agent to the customer in response to an inquiry from the customer

202

Identify one or more trigger phrases in the live feedback if automated response is needed

204

Determine if at least one automated response is needed by comparing and matching the live feedback with at least one predefined trigger pattern

206

Determine from a conversation history database at least one automated response based on the one or more trigger phrases

208

Append the at least one automated response to the live feedback for presentation to the customer during the chat session

INTELLIGENT ASSISTANT

BACKGROUND

Technical Field

This application generally relates to systems, methods and apparatuses, including computer program products, for determining an automated response to augment live feedback from a human agent to a customer during a chat session.

Background

In recent years, there is a significant increase of customer interactions with service representatives across many organizations, which can be a strain in the companies' systems and resources. Traditionally, customer service representatives need to manually search for answers to customer questions during a customer chat session to build full responses to these questions. While a company can expedite the process by onboarding new customer service representatives at an accelerated pace, there is also an opportunity to reduce the chat-time per customer to accommodate more calls/chats per customer representative while maintaining overall customer satisfaction.

SUMMARY OF THE INVENTION

The instant invention provides customer representatives of an organization with a tool for resolving customer queries in as little time as possible. In some embodiments, the present invention serves as a versatile support utility after a live support agent establishes communication with a customer. In some embodiments, an initial response from the agent triggers the present assisted-response utility to formulate and send additional relevant machine-generated responses to the customer. This prevents the human agent from making manual errors, enables provision of faster responses to the customer, and produces synchronized responses. In some embodiments, the present assisted-response utility appends additional relevant information supplied by an automated system to a live agent response for presentation to a customer, thereby allowing the live agent to avoid creating a full response and enabling the automated system to more intelligently supplement a response that would otherwise be manual and error prone for a live agent to create.

In one aspect, the present invention features a computer implemented method for assisting an agent in providing feedback to a customer during a chat session. The method includes receiving, by a computing device, live feedback from the agent to the customer in response to an inquiry from the customer, and determining, by the computing device, if at least one automated response is needed by comparing and matching the live feedback with at least one predefined trigger pattern. The method also includes identifying, by the computing device, one or more trigger phrases in the live feedback if automated response is needed and determining, by the computing device, from a conversation history database at least one automated response based on the one or more trigger phrases. The method further includes appending, by the computing device, the at least one automated response to the live feedback for presentation to the customer during the chat session.

In another aspect, the present invention features a computer-implemented system for assisting an agent in providing feedback to a customer during a chat session. The computer-implemented system includes a computing device having a memory for storing instructions. The instructions, when executed, configure the computer-implemented system to provide a conversation history database, a virtual assistant module and a support module. The conversation history database is configured to store a plurality of historical automated responses. The virtual assistant module is configured to receive live feedback from the agent to the customer in response to an inquiry from the customer during the chat session, determine if at least one automated response is needed by comparing and matching the live feedback with at least one predefined trigger pattern, and identify one or more trigger phrases in the live feedback if automated response is needed. The support module is configured to determine from the conversation history database, based on the one or more trigger phrases, at least one automated response from the plurality of historical automated responses. The virtual assistant module is further configured to append the at least one automated response to the live feedback for presentation to the customer during the chat session.

Any of the above aspects can include one or more of the following features. In some embodiments, the at least one trigger pattern comprises one or more predefined keywords. In some embodiments, the at least one predefined trigger pattern is a regex pattern.

In some embodiments, the comparing between the live feedback and the at least one predefined trigger pattern is implemented using a string-matching algorithm.

In some embodiments, a combination of the live feedback is with the at least one automated response is archived in the conversation history database for future usage.

In some embodiments, only the live feedback is presented to the customer during the chat session if there is no match between the live feedback and the at least one predefined trigger pattern.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 1 shows an exemplary diagram of an intelligent assistant system, according to some embodiments of the present invention.

FIG. 2 shows an exemplary process utilized by the intelligent assistant system of FIG. 1 to automatically assist an agent in providing feedback to a customer during a chat session, according to some embodiments of the present invention.

DETAILED DESCRIPTION

Figure 3:
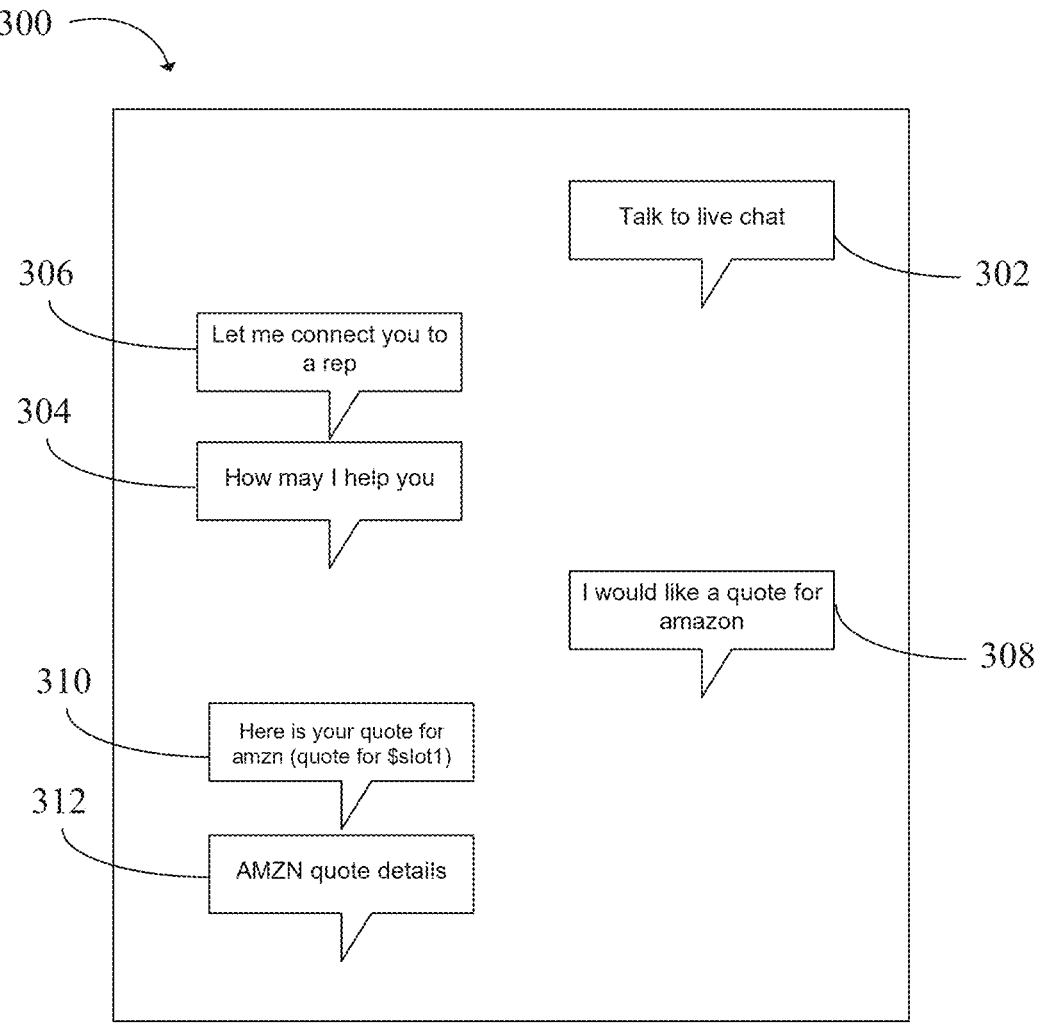
FIG. 3 shows an exemplary graphical user interface illustrating a chat session between a customer and a human agent incorporating the automated response process of FIG. 2, according to some embodiments of the present invention.

FIG. 1 shows an exemplary diagram of an intelligent assistant system 100 used in a computing environment 101 for automatically assisting an agent in providing feedback to a customer during a chat session, according to some embodiments of the present invention. As shown, the computing environment 101 generally includes at least one client computing device 102, a communication network 104, the intelligent assistant system 100, and at least one database 108.

The client computing device 102 can be associated with a human agent. The client computing device 102 can connect to the communication network 104 to communicate with the intelligent assistant system 100 and/or the database 108 to provide inputs and receive outputs for display to the agent. For example, the computing device 102 can provide a detailed graphical user interface (GUI) that displays supplemental information relevant to chat content determined during a chat session in real-time (or near real-time) using the analysis methods and systems described herein. Exemplary computing devices 102 include, but are not limited to, telephones, desktop computers, laptop computers, tablets, mobile devices, smartphones, and internet appliances. It should be appreciated that other types of computing devices capable of connecting to the components of the computing system 101 can be used without departing from the scope of invention. Although FIG. 1 depicts a single computing device 102, it should be appreciated that the computing environment 101 can include any number of client devices for communication by any number of agents associated with an enterprise.

The communication network 104 enables components of the computing environment 101 to communicate with each other to perform the process of relevant response information determination. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The intelligent assistant system 100 is a combination of hardware, including one or more processors and one or more physical memory modules and specialized software engines that execute on the processor of the intelligent voice assistant system 100, to receive data from other components of the computing environment 101, transmit data to other components of the computing environment 101, and perform functions as described herein. As shown, the intelligent voice assistant system 100 executes at least a virtual assistant module 114 and a support module 116. These subcomponents and their functionalities are described below in detail. In some embodiments, the various components of the intelligent assistant system 100 are specialized sets of computer software instructions programmed onto a dedicated processor in the intelligent voice assistant system 100 and can include specifically-designated memory locations and/or registers for executing the specialized computer software instructions.

The database 108 is a computing device (or in some embodiments, a set of computing devices) that is coupled to and in communication with the intelligent assistant system 100 and is configured to provide, receive, and store various types of data received and/or created for determining additional response information relevant to chat content, as described below in detail. In some embodiments, all or a portion of the database 108 is integrated with the intelligent voice assistant system 100 or located on a separate computing device or devices. For example, the database 108 can comprise one or more databases, such as MySQL™ available from Oracle Corp. of Redwood City, California.

FIG. 2 shows an exemplary process 200 utilized by the intelligent assistant system 100 of FIG. 1 to automatically assist an agent in providing feedback to a customer during a chat session, according to some embodiments of the present invention. For example, the exemplary process 200 can automatically determine additional response information relevant to chat content between a customer and an agent during a chat session. It is contemplated that a chat of the present invention encompasses any form of electronic or telephonic communication between a customer and an agent over any suitable communication devices.

The process 200 starts at step 202 with a chat session initiated between a customer and a human agent. The chat session can be initiated by the customer by, for example, the customer asking the agent a question regarding a product or service provided by the organization associates with the agent. In response to the inquiry, the agent can formulate live feedback to the customer during the chat session. In some embodiments, the content of the chat between the customer and the agent, including the inquiry raised by the customer and/or the live response formulated by the agent, is supplied to and analyzed by the intelligent assistant system 100, which then provides supplementary information if needed to the agent and/or the customer in real-time (or near real-time) as the chat progresses. In some embodiments, the live response from the agent is automatically transmitted to the intelligent assistant system 100 and triggers activation of the intelligent assistant system 100. In some embodiments, the automated supplementary response is provided simultaneously with the live agent response.

In some embodiments, if the chat session is a voice-based session, a speech-to-text transcription application is used to convert the captured speech by both the customer and the agent to digitized text in real time (or in near real-time) as the chat progresses. The transcription application can forward the digitized text to the intelligent assistant system 100 in real time (or in near real-time) for further analysis.

At step 204, the virtual assistant module 114 of the intelligent assistant system 100 is configured to monitor receipt of the response formulated by the live agent and/or the inquiry raised by the customer and identify the keywords and/or key phrases (hereinafter collectively referred to as "triggers") that are present in the messages. In some embodiments, the virtual assistant module 114 performs such identification by comparing and matching the live agent response and/or the customer inquiry with one or more predefined trigger patterns, which can include one or more predefined keywords or key phrases. For instance, utilizing a string-matching algorithm, the virtual assistant module 114 can compare the live agent response with one or more of the trigger patterns to identify triggers in the live agent response that are specified in the trigger patterns. As an example, for a financial transaction-related conversation, triggers identified in a live agent response and/or a customer inquiry can be "stock." "quotes," or other financial words/phrases defined in a trigger pattern. In some embodiments, these predefined trigger patterns are stored in the database 108 for easy access by the virtual assistant module 114.

At step 206, the virtual assistant module 114 can determine if these triggers (from step 204) are sufficient to warrant determination of an automated response to supplement the live agent response. For example, such determination can be initiated if the number of keywords and/or key phrases found in the live agent response and/or in the customer message satisfies a predetermined threshold. In some embodiments, the virtual assistant module 114 uses a two-stage approach to make such a determination. First, the inquiry from the customer, including the triggers, are examined for a predetermined regex pattern. This is followed by applying a Natural Language Processing (NPL) model to the customer inquiry to identify an intent from the customer inquiry. If only the regex pattern is matched but an intent cannot be identified from the customer inquiry using the NPL model, the virtual assistant module 114 is adapted to decide that no additional automated response is needed to supplement the live agent response and terminate process 200. Alternatively, if the virtual assistant module 114 identifies an intent, process 200 proceeds to the subsequent steps. Therefore, utilizing the regex pattern removes the risk of the customer receiving an unwanted automated response. In some embodiments, the NPL model also returns a confidence score that indicates whether the model understands the human inquiry. If the confidence score is below a predefined threshold, this indicates that the NPL model does not understand the human inquiry, in which case no additional automated response can be determined.

At step 208, if the virtual assistant module 114 determines that an automated supplementary response is warranted, the virtual assistant module 114 is adapted to forward the agent live response and/or the customer inquiry along with the triggers (from step 204) to the support module 116 for identification of an automated supplementary response. In some embodiments, the support module 116 utilizes the intent determined from the NP model (step 206) to determine an automated response for addition to the live agent response that enhances response performance while minimizing human involvement. For example, the support module 116 can use a predefined chat bot for automated response determination using the intent determined. The chat bot can implement a machine learning model that has been trained using the historical chats stored in the database 108. In some embodiments, the support module 116 is configured to (i) use the triggers to locate in the database 108 one or more historical chats between customers and agents that include the same triggers, and (ii) select these historical chats as supplementary responses to the live agent response for the current chat session. At step 210, if the support module 116 is able to determine an automated response, the support module 116 forwards the automated response to the virtual assistant module 114, which can append the automated response to the live agent response for presentation to the agent and/or the customer during the chat session. In some embodiment, the human agent can approve or disapprove the automated response before it is presented to the customer. Alternatively, if the virtual assistant module 114 determines that an automated response for supplementing a live agent response is not warranted (e.g., there is no match between the live agent response and the trigger patterns) or the support module 116 is unable to determine a suitable automated supplementary response, the virtual assistant module 104 is adapted to only present the live agent response to the customer during the chat session. In some embodiments, the live agent response and/or the automated response are archived in the database 108 as historical chats for future automated response determination.

In some embodiments, the process 200 of FIG. 2 is continuously executed throughout the entire chat session between the customer and the agent whenever an agent provides a response to the customer. Thus, customer-side and agent-side graphical user interfaces can be continuously updated as the chat progresses to display newest combination of automated and live agent responses pertinent to the inquiries from the customer.

FIG. 3 shows an exemplary graphical user interface 300 illustrating a chat session between a customer and a human agent incorporating the automated response process 200 of FIG. 2, according to some embodiments of the present invention. As shown, the customer initiates the chat by asking to speak to a human (message 302). A human agent then generates a response to the customer inquiry-"How may I help you" (message 304). Based on this live agent response 304, the intelligent assistant system 100 can execute the process 200 of FIG. 2 to determine an automated supplemental response "Let me connect you to a rep" (message 306) that is appended before the live agent response, both of which are presented to the customer via the graphical user interface 300 contemporaneously. Alternatively, the automated supplementary response and the live agent response can be presented to the customer sequentially, one after another. Thereafter, the customer enters another request message "I would like a quote for Amazon" (message 308). In response, the human agent generates a response to the customer inquiry-"here is your quote for AMZN" (message 310). Based on this agent response 310, the intelligent assistant system 100 once again executes the process 200 of FIG. 2 to determine an automated supplemental response that includes the actual AMXN quote details (message 312). Both the agent response 310 and the automated quote response 312 can be presented to the customer via the graphical user interface 300.

As another example, the customer can request help making a purchase of a stock—"I need help making a purchase of AMZN." The agent can generate a response in return—"I can help you with your stock purchase for AMZN. How many shares would you like to purchase?" The virtual assistant module 114 receives this live response (step 202 of process 200) and evaluates it for a trigger match to determine if an automated response is warranted to identify additional information related to the exchange (step 204 of process 200). If the virtual assistant module 114 is able to identify the triggers (step 206 of process 200), the virtual assistant module 114 is configured to send the live agent response along with the trigger(s) to the support module 116 for supplemental response determination (step 208 of process 200). An exemplary trigger can be the word "stock" in the live agent response. An exemplary automated supplementary response can be "The current purchase price for AMZN is $550.78 per share." The virtual assistant module 114 can append the supplementary response to the agent response to generate a combined response (step 210 of process 200), such as "I can help you with your stock purchase for AMZN, how many shares would you like to purchase? The current purchase price for AMZN is $550.78 per share." This combined response can be presented to the customer during the chat session. The virtual assistant module 114 can archive the combined response in a database of historical conversations.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A computer implemented method for assisting an agent in providing feedback to a customer during a chat session, the method comprising:

receiving, by a computing device, live feedback formulated by the agent to be displayed to the customer in response to an inquiry from the customer;

determining, by the computing device, if at least one automated response is needed by comparing and matching the live feedback with at least one predefined trigger pattern;

identifying, by the computing device, one or more trigger phrases in the live feedback if automated response is needed;

determining, by the computing device, from a conversation history database at least one automated response based on the one or more trigger phrases;

determining, by the computing device, a combined response comprising the at least one automated response and the live feedback formulated by the agent; and displaying the combined response to the customer during the chat session.

2. The computer-implemented method of claim 1, wherein the at least one trigger pattern comprises one or more predefined keywords.

3. The computer-implemented method of claim 1, wherein the comparing is implemented using a string-matching algorithm.

4. The computer-implemented method of claim 1, further comprising archiving the combined response in the conversation history database for future usage.

5. The computer-implemented method of claim 1, wherein the at least one predefined trigger pattern is a regex pattern.

6. The computer-implemented method of claim 1, further comprising presenting only the live feedback to the customer during the chat session if there is no match between the live feedback and the at least one predefined trigger pattern.

7. A computer implemented system for assisting an agent in providing feedback to a customer during a chat session, the computer-implemented system comprising a computing device having a memory for storing instructions, wherein the instructions, when executed, configure the computer-implemented system to provide:

a conversation history database configured to store a plurality of historical automated responses;

a virtual assistant module configured to:

receive live feedback formulated by the agent to be displayed to the customer in response to an inquiry from the customer during the chat session;

determine if at least one automated response is needed by comparing and matching the live feedback with at least one predefined trigger pattern; and identify one or more trigger phrases in the live feedback if automated response is needed; and a support module configured to determine from the conversation history database, based on the one or more trigger phrases, at least one automated response from the plurality of historical automated responses, wherein the virtual assistant module is further configured to: determine a combined response comprising the at least one automated response and the live feedback formulated by the agent, and display the combined response to the customer during the chat session.

8. The computer implemented system of claim 7, wherein the at least one trigger pattern comprises one or more predefined keywords.

9. The computer implemented system of claim 7, wherein the virtual assistant module implements a string-matching algorithm to perform the comparing.

10. The computer implemented system of claim 7, wherein the conversation history database is configured to archive the combined response for future usage.

11. The computer-implemented system of claim 7, wherein the at least one predefined trigger pattern is a regex pattern.

12. The computer-implemented system of claim 7, wherein the virtual assistant module is configured to present only the live feedback to the customer during the chat session if there is no match between the live feedback and the at least one predefined trigger pattern.

13. The computer-implemented method of claim 1, wherein the displaying of the combined response comprises: simultaneously displaying the at least one automated response and the live feedback to the customer during the chat session.

14. The computer-implemented system of claim 7, wherein the virtual assistant module is further configured to simultaneously display the at least one automated response and the live feedback to the customer during the chat session.

\* \* \* \* \*